(12) United States Patent
Takaoka

(10) Patent No.: US 9,388,052 B2
(45) Date of Patent: Jul. 12, 2016

(54) SILICOALUMINOPHOSHPHATE MOLECULAR SIEVE AND METHOD OF PRODUCING SAME

(75) Inventor: Kanji Takaoka, Tokyo (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 353 days.

(21) Appl. No.: 14/240,259

(22) PCT Filed: Aug. 20, 2012

(86) PCT No.: PCT/IB2012/001761
§ 371 (c)(1),
(2), (4) Date: Feb. 21, 2014

(87) PCT Pub. No.: WO2013/027117
PCT Pub. Date: Feb. 28, 2013

(65) Prior Publication Data
US 2014/0193328 A1 Jul. 10, 2014

(30) Foreign Application Priority Data
Aug. 23, 2011 (JP) ................................. 2011-181612

(51) Int. Cl.
*C01B 39/54* (2006.01)
*C01B 37/08* (2006.01)
*B01J 29/85* (2006.01)
*B82Y 30/00* (2011.01)

(52) U.S. Cl.
CPC ................ *C01B 39/54* (2013.01); *B01J 29/85* (2013.01); *B82Y 30/00* (2013.01); *C01B 37/08* (2013.01); *C01P 2004/64* (2013.01)

(58) Field of Classification Search
CPC ..... C01B 39/54; C01B 37/08; C01P 2004/64; B01J 29/85
See application file for complete search history.

(56) References Cited

U.S. PATENT DOCUMENTS

| 5,126,308 | A | 6/1992 | Barger et al. |
| 6,773,688 | B2 | 8/2004 | Mertens et al. |
| 7,009,086 | B2 * | 3/2006 | Brown ................. B01J 29/85 585/639 |
| 7,052,664 | B2 | 5/2006 | Mertens et al. |
| 7,375,050 | B2 * | 5/2008 | Mertens .............. G01J 29/7015 423/305 |

FOREIGN PATENT DOCUMENTS

| EP | 2 025 645 A1 | 2/2009 |
| JP | 2005-112655 A | 4/2005 |
| JP | 2005-511669 A | 4/2005 |
| JP | 2009-538810 A | 11/2009 |
| JP | 2010-280516 A | 12/2010 |
| WO | 03/048084 A2 | 6/2003 |

OTHER PUBLICATIONS

Yingxu Wei et al.: "Mn-containing ALPO-11 and SAPO-11 catalysts for simultaneous isomerization and dehydrogenation of *n*-butane", Catalysis Letters, J.C. Baltzer AG—Scientific Publishing CH, vol. 91, Nos. 1-2, Nov. 2003, XP-002686210, pp. 35-40.

Yingxu Wei et al.: "Study of Mn incorporation into SAPO framework: Synthesis, characterization and catalysis in chloromethane conversion to light olefins", Microporous and Mesoporous Materials, Elsevier Science Publishing, New York, US, vol. 90, Mar. 20, 2006, pp. 188-197.

Dazhi Zhang et al.: "MgAPSO-34 molecular sieves with various Mg sloichiometries: Synthesis, characterization and catalytic behavior in the direct transformation of chloromethane into light olefins", Microporous and Mesoporous Materials,-Elsevier Science Publishing, New York, US, vol. 116, Nos. 1-3, Dec. 1, 2008, pp. 684-692.

Delphine R. Dubois et al.: "Conversion of methanol to olefins over cobalt-, manganese- and nickel-incorporated SAPO-34 molecular sieves", Fuel Processing Technology, Elsevier NL, vol. 83, Nos. 1-3 SPEC., Sep. 5, 2003, pp. 203-218.

Yuichiro Hirota et al.: "Dry gel conversion synthesis of SAPO-34 nanocrystals", Materials Chemistry and Physics, vol. 123 (2010), pp. 507-509.

* cited by examiner

*Primary Examiner* — David M Brunsman
(74) *Attorney, Agent, or Firm* — Sughrue Mion, PLLC

(57) ABSTRACT

A silicoaluminophosphate molecular sieve being represented by the compositional formula $(Si_aAl_bP_cM_d)O_2$ where M is magnesium, a is 0.05 to 0.17, b is 0.45 to 0.55, c is 0.33 to 0.45, d is 0.001 to 0.030, and a+b+c+d=1, and an average primary particle size of 60 nm or less. A method of producing the silicoaluminophosphate molecular sieve includes carrying out a hydrothermal treatment on a mixture that contains a silicon source, an aluminum source, a phosphorus source, a structure-directing agent, and at least one of an inorganic magnesium salt or an organic magnesium salt or an inorganic manganese salt or an organic manganese salt at 0.001 to 0.1 mole per mole of the aluminum source.

6 Claims, 2 Drawing Sheets

SILICOALUMINOPHOSHPATE MOLECULAR SIEVE AND METHOD OF PRODUCING SAME

This application is a 371 filing of PCT/IB2012/001761, filed 23 Aug. 2011.

BACKGROUND OF THE INVENTION

1. Field of the Invention

The invention relates to a silicoaluminophosphate (SAPO) molecular sieve and to a method of producing this SAPO molecular sieve.

2. Description of Related Art

SAPO molecular sieves are used, for example, as catalyst materials in various chemical reactions. Use as a catalyst for conversion from an oxygenate to an olefin is available as one such application. SAPO-34 in particular has received attention as an important catalyst among the SAPO molecular sieves for such catalyst applications.

SAPO-34 is a SAPO molecular sieve with the CHA structure and is available exhibiting a high lower olefin selectivity in the conversion of methanol to olefin. It has been reported that SAPO-34 with a smaller crystal size exhibits a better catalytic activity (U.S. Pat. No. 5,126,308) in this reaction, and a great deal of research has been carried out into micronizing the catalyst.

A method of producing SAPO-34 having a crystal size of not more than 100 nm is disclosed in Published Japanese Translation of PCT Application No. 2005-511669 (JP 2005-511669 A). Here, SAPO-34 having a cubic-like morphology of not more than 100 nm is produced by adding ethanol to a hydrogel and carrying out hydrothermal synthesis.

It is disclosed in U.S. Pat. Nos. 6,773,688 and 7,052,664 that SAPO-34 having a crystal size of not more than 100 nm can be produced by carrying out hydrothermal synthesis after dissolving the silica source in a basic organic template solution.

The production of SAPO-34 having an average crystal size of 75 nm by carrying out hydrothermal synthesis after drying the hydrogel to give a dry gel is disclosed by Hirota, Y., et al. *Materials Chemistry and Physics* (2010) 123, 507-509.

Thus, as indicated above, zeolites and particularly SAPO-34 having a small crystal size can be obtained by various methods. However, an organic solvent must be used in the method of JP 2005-511669 A, which then requires the use of a reactor that exhibits greater pressure resistance than an ordinary hydrothermal synthesis apparatus. The methods in U.S. Pat. Nos. 6,773,688 and 7,052,664 and Hirota, Y., et al. *Materials Chemistry and Physics* (2010) 123, 507-509 require a pretreatment of the starting material, i.e., dissolution or drying, which creates the problem that a one-pot production cannot be carried out.

SUMMARY OF THE INVENTION

The invention therefore provides a SAPO molecular sieve with a crystal size about the same as or smaller than the heretofore existing crystal sizes, and does so by a simpler and more convenient method using a generic reaction apparatus.

As a result of extensive and intensive investigations in order to solve the problems identified above, the inventor discovered that a highly crystalline cubic SAPO molecular sieve is obtained by adding a small amount of a magnesium salt or a manganese salt to a mixture that includes a silicon source, an aluminum source, a phosphorus source, and a structure-directing agent and then carrying out a hydrothermal synthesis. The invention was achieved based on this discovery. Thus, the method according to the first aspect of the invention for producing a SAPO molecular sieve includes: carrying out a hydrothermal treatment on a mixture of a silicon source, an aluminum source, a phosphorus source, a structure-directing agent, and at least one of an inorganic magnesium salt or an organic magnesium salt or an inorganic manganese salt or an organic manganese salt at 0.001 to 0.1 mole per mole of the aluminum source.

The structure-directing agent may be preferably a quaternary ammonium compound in this first aspect.

The SAPO molecular sieve may be of CHA type in this first aspect.

Magnesium or manganese may be preferably also removed in this first aspect.

The SAPO molecular sieve according to the second aspect of the invention is represented by the compositional formula $(Si_aAl_bP_cM_d)O_2$ wherein M is magnesium or manganese, a is 0.05 to 0.17, b is 0.45 to 0.55, c is 0.33 to 0.45, d is 0.001 to 0.030, and $a+b+c+d=1$, and has an average primary particle size of not more than 120 nm.

In this second aspect, M may be magnesium and the average primary particle size is 60 nm or less.

In this second aspect, the SAPO molecular sieve may be of CHA type.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
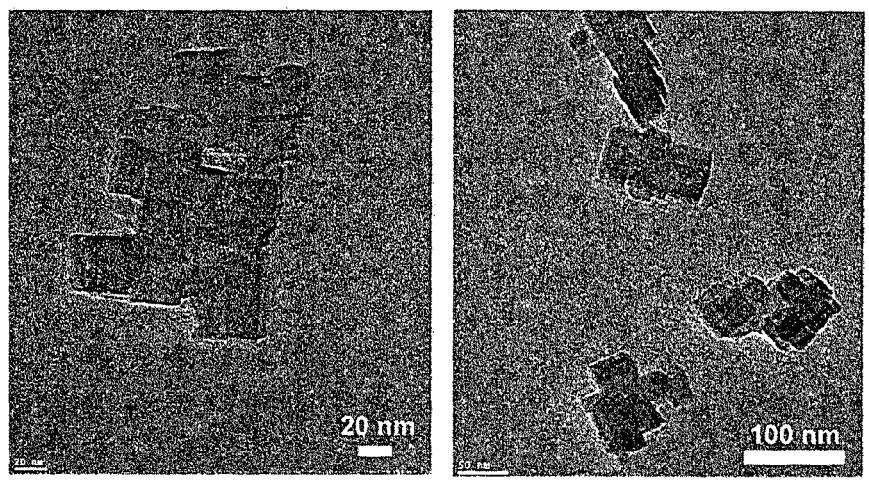
FIG. 1 gives a TEM image of the SAPO-34 obtained in Example 2.

Exemplary embodiments of the invention are described in detail herebelow. The SAPO molecular sieve of the invention is not particularly limited and may be exemplified by SAPO-5, SAPO-11, SAPO-17, SAPO-18, SAPO-26, SAPO-31, SAPO-33, SAPO-34, SAPO-35, SAPO-41, SAPO-42, SAPO-43, SAPO-44, SAPO-47, and SAPO-56. Among the preceding, SAPO-34, SAPO-44, and SAPO-47, which have the CHA structure, are more preferred for the method of the invention for producing SAPO molecular sieve.

The SAPO molecular sieve of these exemplary embodiments has a chemical composition, expressed on an anhydrous basis, represented by the compositional formula $(Si_aAl_bP_cM_d)O_2$. Here, M is magnesium or manganese, a is 0.05 to 0.17, b is 0.45 to 0.55, and c is 0.33 to 0.45. In addition, d is 0.001 to 0.030, preferably 0.003 to 0.025, and more preferably 0.005 to 0.02, and in the particular case in which M is manganese, d is preferably 0.008 to 0.015. $a+b+c+d=1$.

When M is magnesium, the average primary particle size of the SAPO molecular sieve of these embodiments is 30 to 60 nm, while the lower limit is preferably at least 35 nm and more preferably at least 40 nm and the upper limit is preferably not more than 55 nm and more preferably not more than 50 nm. The crystals generally have a size in the range from approximately 20 to 80 nm. When M is manganese, the average primary particle size is generally 70 to 120 nm and the lower limit is preferably at least 75 nm and more preferably at least 80 nm while the upper limit is preferably not more than 110 nm, more preferably not more than 100 nm, and even more preferably not more than 90 nm. The crystals generally have a size in the range from approximately 70 to 200 nm. The average primary particle size can be calculated by obtaining an image from three different visual fields using a scanning electron microscope (SEM) or a transmission electron microscope (TEM); measuring a side on 50 to 100 randomly selected cuboid-shaped crystals in these images; and taking the arithmetic mean of these values. When, in this case, the average primary particle size satisfies the values indicated in the preceding, the images may be obtained using either SEM or TEM.

When the SAPO molecular sieve has been microparticulated, for example, it can be favorably used for a catalyst for, e.g., hydrocracking or alkylation, due to its large external specific surface area. It can also be favorably utilized as a catalyst support in order to support, e.g., a metal or metal oxide, and as an adsorbent for, e.g., various gases and liquids. Furthermore, a zeolite that has a microfine primary particle size exhibits an excellent ion-exchange rate, which then also makes it possible to efficiently functionalize the zeolite through the ion-exchange capacity.

The method of these exemplary embodiments for producing a SAPO molecular sieve is a method that provides a SAPO molecular sieve that satisfies the properties given above, but is not otherwise particularly limited, and production can be carried out by heating a mixture containing at least a silicon source, an aluminum source, a phosphorus source, a structure-directing agent, an inorganic or organic magnesium salt or manganese salt, and water generally at 140 to 220° C. and preferably 160 to 200° C. for generally 4 to 72 hours and preferably 8 to 64 hours and crystallizing while standing or stirring.

There are no particular limitations on the silicon source, and the silicon source can be exemplified by colloidal silica, fumed silica, silica sol, water glass, ethyl silicate, and methyl silicate with colloidal silica being preferred.

There are no particular limitations on the aluminum source, and the aluminum source can be exemplified by aluminum alkoxides such as aluminum isopropoxide, pseudo-boehmite, and aluminum triethoxide, and also by aluminum hydroxide, alumina sol, and sodium aluminate with aluminum isopropoxide being preferred.

There are no particular limitations on the phosphorus source, and the phosphorus source can be exemplified by phosphoric acid. For example, aluminum phosphate may be used.

The structure-directing agent in these exemplary embodiments is a compound necessary for determining the structure of the molecular sieve, and is also available as a template. There are no particular limitations on the structure-directing agent, and the structure-directing agent can be exemplified by amines and quaternary ammonium compounds.

This amine is, for example, a compound represented by the following formula (1): $NR^1R^2R^3$. $R^1$, $R^2$, and $R^3$ in the formula each represent the hydrogen atom, an alkyl group, or an alkynyl group, but $R^1$, $R^2$, and $R^3$ may not all be the hydrogen atom at the same time. $R^1$ and $R^2$ may, together with the adjacent nitrogen atom, have a substituent or form a saturated or unsaturated 5-membered to 8-membered ring. When at least one of $R^1$, $R^2$, and $R^3$ in formula (1) is an alkyl group, this alkyl group can be exemplified by the methyl group, ethyl group, propyl group, and butyl group, and the number of carbons therein is generally from about 1 to 4. When $R^1$ and $R^2$ form a saturated or unsaturated 5-membered to 8-membered ring together with the adjacent nitrogen atom, this ring may additionally contain at least one atom selected from the nitrogen atom, oxygen atom, and sulfur atom. Unless otherwise noted, these 5-membered to 8-membered rings may be substituted by one or more substituents selected from, for example, aromatic groups, acyl groups, the hydroxyl group, the carboxyl group, the amino group ($-NH_2$), the nitro group, halogen atoms, and $C_{1-6}$ alkoxy groups (for example, the methoxy group, ethoxy group, and propoxy group). Specific examples are alkylamines such as monomethylamine, monoethylamine, monopropylamine, monobutylamine, dimethylamine, diethylamine, dipropylamine, dibutylamine, trimethylamine, triethylamine, tripropylamine, and tributylamine; allylamines such as monoallylamine, diallylamine, and triallylamine; as well as cyclopentylamine, cyclohexylamine, aminomethylcyclohexane, piperidine, morpholine, and pyridine.

The aforementioned quaternary ammonium compound is, for example, a compound containing quaternary ammonium as represented by the following formula (2): $R^1R^2R^3R^4N^+$. $R^1$, $R^2$, $R^3$, $R^3$, and $R^4$ in the formula each represent an alkyl group, aralkyl group, aryl group, or allyl group. For example, the hydroxide, halide, sulfate, or nitrate of this quaternary ammonium can be used, and two or more of these may be used as necessary. When at least one of $R^1$, $R^2$, $R^3$, and $R^4$ in formula (2) is an alkyl group, this alkyl group can be exemplified by the methyl group, ethyl group, propyl group, and butyl group, and the number of carbons therein is generally from about 1 to 4. When at least one of $R^1$, $R^2$, $R^3$, and $R^4$ is an aralkyl group, this aralkyl group can be exemplified by the benzyl group and tolylmethyl group, and the number of carbons therein is generally about 7 to 10. When at least one of $R^1$, $R^2$, $R^3$, and $R^4$ is an aryl group, this aryl group can be exemplified by the phenyl group and tolyl group, and the number of carbons therein is generally about 6 to 10. Specific examples are the hydroxide, halide, sulfate, and nitrate of tetramethylammonium, tetraethylammonium, tetrapropylammonium, tetrabutylammonium, tributylbenzylammonium, propyltrimethylammonium, dibenzyldimethylammonium, and tetraallylammonium, wherein tetraethylammonium hydroxide (TEAOH) is preferred.

There are no particular limitations on the inorganic or organic magnesium salt or manganese salt, and the inorganic or organic magnesium salt or manganese salt can be exemplified by inorganic acid salts of magnesium or manganese, e.g., the sulfate salt, nitrate salt, phosphate salt, chloride, and bromide, and by organic acid salts of magnesium or manganese, e.g., the acetate, oxalate, and citrate, wherein the nitrate salt and acetate salt are preferred. Magnesium nitrate and manganese acetate are particularly preferred.

In the method of these exemplary embodiments for producing a SAPO molecular sieve, the silicon source can be added to the previously described mixture generally at 0.01 to 0.5 mole and preferably 0.1 to 0.5 mole, expressed per mole of the aluminum source. The phosphorus source can be added, expressed per mole of the aluminum source, generally at 0.6 to 8 moles and preferably 1 to 4 moles. The structure-directing agent can be added, expressed per mole of the aluminum source, generally at 1 to 8 moles and preferably 1 to 4 moles. The Magnesium salt or manganese salt can be added, expressed per mole of the aluminum source, at 0.001 to 0.1 and preferably 0.005 to 0.03 mole. In addition, the water is adjusted to generally 10 to 200 moles and preferably 15 to 140 moles per mole of the aluminum source.

The resulting SAPO molecular sieve may be used as obtained or may be used after removal of metal element by an ordinary method, e.g., ion exchange. In addition, it may also be appropriately modified with a carrier and used as a catalyst, adsorbent, or ion exchanger. It may also be mixed in such cases with an additive, e.g., a binder. The binder can be exemplified by a clay compound such as kaolinite, sericite, talc, mica, montmorillonite, sepiolite, attapulgite, and smectite, as well as by silica, alumina, titania, zirconia, and quartz.

A matrix agent may also be added as an additive. There are no particular limitations, on this matrix agent, and the matrix agent can be exemplified by rare-earth metals; metal oxides such as titania, zirconia, magnesia, thoria, beryllia, quartz, and silica, for example, silica-magnesia, silica-zirconia, silica-titania, silica-alumina, and silica-alumina-thoria; and natural clays obtained from the montmorillonite and kaolin groups. These natural clays include conventional subbentonites and kaolins such as Dixie, McNamee, Georgia, and Florida clays. In addition to the preceding, halloysite, kaolinite, dickite, nacrite, anauxite, and so forth, can be used. An available treatment method, e.g., calcination and/or an acid treatment and/or a chemical treatment, can also be applied to this matrix agent.

There are no particular limitations on the production of an olefin mixture using a SAPO molecular sieve produced as described above, and conventional methods can be used. At least one oxygenate is used as the feedstock, and, more specifically, at least one organic compound that contains at least one oxygen atom is used. For example, the following may be used: a $C_{1-20}$ aliphatic alcohol such as methanol, ethanol, n-propanol, or isopropanol; a $C_{2-10}$ ether such as methyl ethyl ether, dimethyl ether, diethyl ether, or diisopropyl ether; a $C_{1-4}$ aldehyde such as formaldehyde; a $C_{3-8}$ ketone such as dimethyl ketone; a $C_{3-9}$ carbonate ester such as dimethyl carbonate; a $C_{1-4}$ carboxylic acid such as acetic acid; and mixtures of the preceding. The aliphatic alcohol preferably has from 1 to 10 carbon atoms and more preferably from 1 to 4 carbon atoms. Lower straight-chain and branched-chain aliphatic alcohols and their unsaturates are alcohols useful as feedstocks for the method of these exemplary embodiments.

In one embodiment of the invention, at least one of the aforementioned oxygenates, used as a feedstock, is converted to a $C_{2-6}$ and preferably a $C_{2-4}$ olefin in the presence of a catalyst containing the molecular sieve according to these exemplary embodiments. For example, with regard to an olefin by itself or a mixture containing at least one olefin, conversion into a desired olefin, preferably ethylene and/or propylene, can be performed from a feedstock that contains an oxygenate, preferably an alcohol and more preferably methanol.

Examples of the invention are more specifically described herebelow, but the scope of the invention is not limited to these examples.

Example 1

Evaluation of the Properties of the SAPO-34

The crystalline form and crystal size were evaluated using images obtained with a SEM (JCM-5100, JEOL Ltd.) or a TEM (H-9500, Hitachi High-Technologies Corporation). For the crystal size, one edge was measured on the cuboid crystals in an image and this was taken to be the crystal size. The average primary particle size was determined by randomly selecting 50 to 100 molecular sieves from images in three different visual fields and taking the arithmetic mean.

The production of SAPO-34 was confirmed by comparing the structure pattern by X-ray diffraction (XRD) of the synthesized SAPO-34 with the structure pattern given in U.S. Pat. No. 4,440,871.

Elemental analysis of the SAPO-34 was carried out by inductively coupled plasma (ICP) (ICPE-9000, Shimadzu Corporation).

Example 2

Production of Magnesium-Containing SAPO-34

6.85 g of Ludox (registered trademark) HS-30 (30 weight % in water, Aldrich, same below) and 193.86 g of an aqueous solution of TEAOH, 35 weight % in water, Aldrich, same below) were introduced into a polytetrafluoroethylene beaker. To this solution were added 24.11 g aluminum isopropoxide (purity at least 98%, Aldrich, same below) and also 53.27 g phosphoric acid (85 weight % in water, Aldrich, same below). 0.73 g magnesium nitrate hexahydrate (Wako Pure Chemical Industries, Ltd.) was added to the homogeneous mixture. A mixture having the following composition, as the molar ratio, was obtained: $0.6SiO_2/Al_2O_3/4P_2O_5/8TEAOH/133H_2O/0.05Mg(NO_3)_2$. This mixture was transferred to an SUS316 autoclave having a polytetrafluoroethylene internal cylinder and was treated by heating for 64 hours at 180° C. This was followed by removal from the autoclave, washing with deionized water, and drying for 12 hours at 100° C. to obtain a powder product. This product was confirmed to be SAPO-34 from the XRD pattern. Quantitation of the individual elements in the product by ICP gave $Si_{0.124}Al_{0.466}P_{0.393}Mg_{0.017}$.

It was confirmed by TEM analysis that crystals with a cubic-like form were obtained. The crystal side was in the range from 0.02 to 0.08 μm and the average primary particle size was 0.04 μm (FIG. 1).

Example 3

Production of Manganese-Containing SAPO-34

A solution containing 6.85 g Ludox HS-30 and 193.86 g of the aqueous TEAO solution was produced in a polytetrafluoroethylene beaker. To this solution were added 24.11 g aluminum isopropoxide and also 53.27 g phosphoric acid. 0.70 g manganese acetate tetrahydrate (Wako Pure Chemical Industries, Ltd.) was added to the homogeneous mixture. A mixture having the following composition, as the molar ratio, was obtained: $0.6SiO_2/Al_2O_3/4P_2O_5/8TEAOH/133H_2O/0.05Mn(CH_3COO)_2$. This mixture was transferred to an SUS316 autoclave having a polytetrafluoroethylene internal cylinder and was treated by heating for 64 hours at 180° C. This was followed by removal from the autoclave, washing with deionized water, and drying for 12 hours at 100° C. to obtain a powder product. This product was confirmed to be SAPO-34 from the XRD pattern. Quantitation of the individual elements in the product by ICP gave $SiO_{0.123}Al_{0.474}P_{0.392}Mn_{0.011}$.

Figure 2:
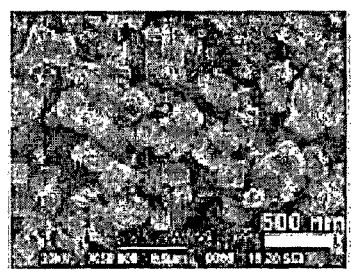
FIG. 2 gives an SEM image of the SAPO-34 obtained in Example 3.

It was confirmed by SEM analysis that crystals with a cubic-like form were obtained. The crystal side was in the range from 0.07 to 0.2 μm and the average primary particle size was 0.1 μm (FIG. 2).

Example 4

Production of Magnesium-Containing SAPO-34

The same procedure as in Example 2 was carried out, but in this case adding 0.22 g of the magnesium nitrate hexahydrate to obtain a mixture having the following composition: $0.6SiO_2/Al_2O_3/4P_2O_5/8TEAOH/133H_2O/0.015Mg(NO_3)_2$. This mixture was transferred to an SUS316 autoclave having a polytetrafluoroethylene internal cylinder and was treated by heating for 64 hours at 180° C. This was followed by removal from the autoclave, washing with deionized water, and drying for 12 hours at 100° C. to obtain a powder product. This product was confirmed to be SAPO-34 from the XRD pattern. Quantitation of the individual elements in the product by ICP gave $Si_{0.131}Al_{0.483}P_{0.381}Mg_{0.005}$.

Figure 3:
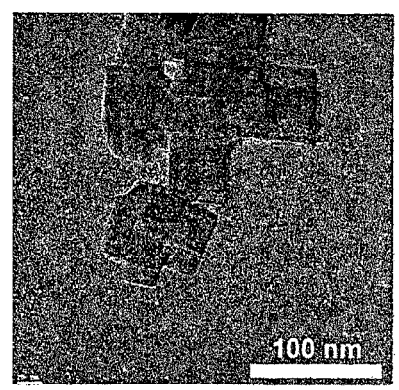
FIG. 3 gives a TEM image of the SAPO-34 obtained in Example 4.

It was confirmed by TEM analysis that Crystals with a cubic-like form were obtained. The crystal side was in the range from 0.02 to 0.08 μm and the average primary particle size was 0.05 μm (FIG. 3).

Comparative Example 1

Production of SAPO-34 (Lacking Both Magnesium and Manganese)

A solution containing 6.85 g Ludox HS-30 and 193.86 g of the aqueous TEAO solution was produced in a polytetrafluoroethylene beaker. To this solution were added 24.11 g aluminum isopropoxide and also 53.27 g phosphoric acid. A homogeneous mixture having the following composition, as the molar ratio, was obtained: $0.6SiO_2/Al_2O_3/4P_2O_5/8TEAOH/133H_2O$. This mixture was transferred to an SUS316 autoclave having a polytetrafluoroethylene internal cylinder and was treated by heating for 64 hours at 180° C. This was followed by removal from the autoclave, washing with deionized water, and drying for 12 hours at 100° C. to obtain a powder product. This product was confirmed to be SAPO-34 from the XRD pattern. Quantitation of the individual elements in the product by ICP gave $Si_{0.123}Al_{0.479}P_{0.398}$.

It was confirmed by SEM analysis that crystals with a cubic-like form were obtained. The crystal side was in the range from 0.2 to 0.8 μm and the average primary particle size was 0.5 μm.

Comparative Example 2

Comparison of Other Metal Salts with the Magnesium Salt or Manganese Salt

Figure 4:
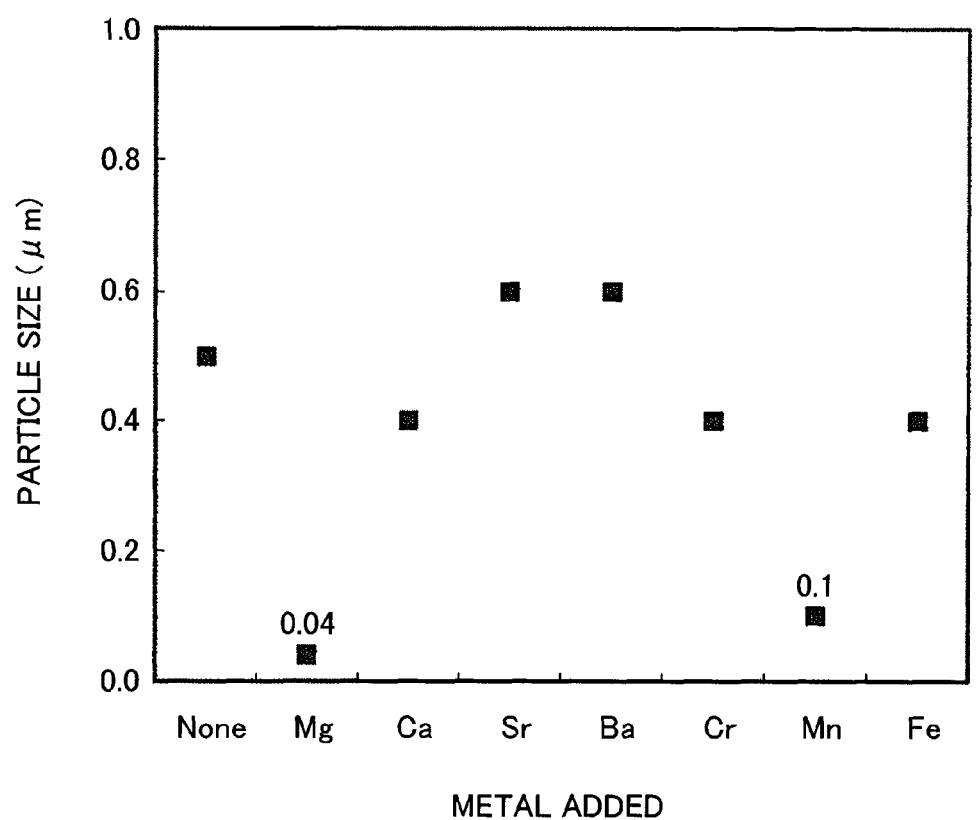
FIG. 4 provides a diagram that compares the crystal size of SAPO-34 that has a magnesium salt, or a manganese salt, or another metal salt.

Proceeding as in the examples described above, the average primary particle size of the obtained crystals was also measured (Table 1, FIG. 4) for calcium nitrate, strontium nitrate, barium nitrate, chromium (III) nitrate nonahydrate, and iron (III) nitrate nonahydrate in place of the magnesium salt and manganese salt. According to the results, it was shown that the average primary particle size was not more than 0.1 μm when a magnesium salt and manganese salt was added, while the average primary particle size exceeded 0.4 μm when another metal was added.

TABLE 1

| metal added | average primary particle size (μm) |
|---|---|
| none | 0.5 |
| Mg | 0.04 |
| Ca | 0.4 |
| Sr | 0.6 |
| Ba | 0.6 |
| Cr | 0.4 |
| Mn | 0.1 |
| Fe | 0.4 |

Example 5

Evaluation of the Catalytic Performance

The SAPO-34 powder obtained as described above was packed into a quartz tube, and a solid acid catalyst for reaction was obtained by calcination by holding for 6 hours at 600° C. in an oxygen-containing air flow at 100 mL/minute per 1 g of the powder. The structure stabilizer remaining in the pores of the SAPO-34 is thereby burned off.

The obtained solid acid catalyst was then molded to a size of 16 to 32 mesh and 500 mg of this was packed into a quartz reaction tube having an interior diameter of 10 mm in an atmospheric pressure fixed bed flow-through reactor. A mixed gas of 50 volume % ethanol and 50 volume % nitrogen was fed into this reactor passing through a vaporizer so as to provide a weight hourly space velocity for the ethanol of 1.5 $h^{-1}$, and a reaction was carried out for 4 hours at 0.1 MPa and 400° C. The weight hourly space velocity WHSV ($h^{-1}$) is determined by dividing the ethanol flow rate (g/h) by the catalyst weight (g). The product was analyzed by gas chromatography after completion of the reaction. The yield (carbon mole %) of ethylene, propylene, butene, $C_1$-$C_4$ alkane, and $C_{=5}$ hydrocarbon four hours after the start of the reaction is shown in Table 2 below.

TABLE 2

| | Mg-containing SAPO-34 (Example 2) | Mn-containing SAPO-34 (Example 3) | SAPO-34 (Comparative Example 1) |
|---|---|---|---|
| average primary particle size (μm) | 0.04 | 0.1 | 0.5 |
| Si/(Si + Al + P) | 0.124 | 0.123 | 0.123 |
| ethylene yield (%) | 68 | 70 | 82 |
| propylene yield (%) | 19 | 18 | 14 |
| butene yield (%) | 5 | 4 | 1 |
| $C_1$-$C_4$ alkane yield (%) | 3 | 2 | 2 |
| $C_5$+ yield (%) | 5 | 5 | 1 |

When ethanol is used as the starting material, under the conditions of this test the ethanol is converted to ethylene by the dehydration reaction followed by conversion to other hydrocarbon. The ethylene consumption is therefore calculated using the following formula: ethylene consumption %=(100%−ethylene yield %).

According to Table 2, the ethylene consumption was 32% and the propylene yield was 19% for the SAPO-34 obtained according to Example 2, while the ethylene consumption was 30% and the propylene yield was 18% for the SAPO-34 obtained according to Example 3. On the other hand, the ethylene consumption was 18% and the propylene yield was 14% for the SAPO-34 obtained according to Comparative Example 1, and the ethylene consumption and propylene yield were both lower than for the use of the SAPO-34 obtained according to the method of these examples. According to these results, SAPO-34 having a crystal size made smaller by the addition of a magnesium salt or manganese salt demonstrated a higher ethylene consumption, i.e., a higher catalytic activity, and also a higher propylene yield. The cost attributable to the catalyst can thus be reduced because the higher catalytic activity enables a reduction in the amount of catalyst required to process a certain constant amount of starting material. In addition, equipment costs can also be reduced because the reactor can be made smaller as a consequence of the reduction in the amount of catalyst.

The invention claimed is:

1. A silicoaluminophosphate molecular sieve being represented by the compositional formula $(Si_aAl_bP_cM_d)O_2$
where M is magnesium, a is 0.05 to 0.17, b is 0.45 to 0.55, c is 0.33 to 0.45, d is 0.001 to 0.030, and a+b+c+d=1, and an average primary particle size is 60 nm or less.

2. The silicoaluminophosphate molecular sieve according to claim 1, wherein the silicoaluminophosphate molecular sieve is of CHA type.

3. The silicoaluminophosphate molecular sieve according to claim 1, wherein:
the silicoaluminophosphate molecular sieve is obtained by carrying out a hydrothermal treatment on a mixture of a silicon source, an aluminum source, a phosphorus source, a structure-directing agent, and at least one of an inorganic magnesium salt or an organic magnesium salt at 0.001 to 0.1 mole per mole of the aluminum source.

4. The silicoaluminophosphate molecular sieve according to claim 3, wherein the structure-directing agent is a quaternary ammonium compound.

5. The silicoaluminophosphate molecular sieve according to claim 3, wherein the silicoaluminophosphate molecular sieve is of CHA type.

6. The silicoaluminophosphate molecular sieve according to claim 3, wherein:
the silicoaluminophosphate molecular sieve is obtained by removing magnesium.

* * * * *